US010484499B2

(12) United States Patent
Lopiano

(10) Patent No.: US 10,484,499 B2
(45) Date of Patent: Nov. 19, 2019

(54) SELECTING CONTENT FOR PRESENTATION TO AN ONLINE SYSTEM USER BASED ON AFFINITIES OF THE USER FOR ADDITIONAL USERS INFERRED FROM AN ORGANIZATIONAL CHART

(71) Applicant: Facebook, Inc., Menlo Park, CA (US)

(72) Inventor: Fabio Lopiano, London (GB)

(73) Assignee: Facebook, Inc., Menlo Park, CA (US)

( * ) Notice: Subject to any disclaimer, the term of this patent is extended or adjusted under 35 U.S.C. 154(b) by 453 days.

(21) Appl. No.: 14/750,524

(22) Filed: Jun. 25, 2015

(65) Prior Publication Data

US 2016/0381172 A1 Dec. 29, 2016

(51) Int. Cl.
*H04L 29/08* (2006.01)
*H04L 12/58* (2006.01)
*G06Q 50/00* (2012.01)

(52) U.S. Cl.
CPC .......... *H04L 67/306* (2013.01); *G06Q 50/01* (2013.01); *H04L 51/32* (2013.01)

(58) Field of Classification Search
CPC ........ H04L 12/588; H04L 51/32; G06Q 50/01
See application file for complete search history.

(56) References Cited

U.S. PATENT DOCUMENTS

| | | | | |
|---|---|---|---|---|
| 7,539,697 B1* | 5/2009 | Akella | .............. | G06F 17/30958 |
| 9,756,006 B2 | 9/2017 | Shapero et al. | | |
| 2004/0088325 A1* | 5/2004 | Elder | ..................... | G06Q 10/10 |
| 2009/0265431 A1* | 10/2009 | Jania | .................... | G06Q 10/107 |
| | | | | 709/206 |
| 2009/0313346 A1* | 12/2009 | Sood | ....................... | G06Q 10/10 |
| | | | | 709/207 |
| 2010/0257023 A1 | 10/2010 | Kendall et al. | | |
| 2011/0055333 A1* | 3/2011 | Guy | ..................... | G06Q 10/107 |
| | | | | 709/206 |

(Continued)

FOREIGN PATENT DOCUMENTS

KR  10-2015-0026071 A   3/2015

OTHER PUBLICATIONS

PCT International Search Report and Written Opinion, PCT Application No. PCT/US2016/035493, dated Aug. 31, 2016, thirteen pages.

*Primary Examiner* — Azizul Choudhury
(74) *Attorney, Agent, or Firm* — Fenwick & West LLP

(57) ABSTRACT

An online system provides a social networking environment for a set of users, enabling the users to establish connections with and to communicate with each other. Absent explicit connections between a user and an additional user in the set, the online system determines a measure of affinity of the user for the additional user based on an organizational chart for an organization including the set of users that indicates relationships between the users based on their roles in the organization. The measure of affinity may also be based on actions associated with the user and the additional user and characteristics of the user and the additional user. Based on the measure of affinity, the online system determines whether to establish an inferred connection between the user and the additional user. The online system may account for the inferred connection when identifying content for presentation to the user.

20 Claims, 6 Drawing Sheets

(56) References Cited

U.S. PATENT DOCUMENTS

| | | | |
|---|---|---|---|
| 2011/0246574 A1* | 10/2011 | Lento | G06Q 10/10 709/204 |
| 2012/0328163 A1 | 12/2012 | Panzer et al. | |
| 2014/0006400 A1* | 1/2014 | Bastide | G06Q 10/0639 707/737 |
| 2014/0032659 A1 | 1/2014 | Marini et al. | |
| 2014/0149507 A1 | 5/2014 | Redfern et al. | |
| 2015/0100683 A1* | 4/2015 | Chung | H04L 67/22 709/224 |
| 2015/0142584 A1 | 5/2015 | Liu et al. | |
| 2015/0169744 A1* | 6/2015 | Walkingshaw | G06Q 30/0251 707/738 |
| 2015/0248651 A1* | 9/2015 | Akutagawa | G06Q 10/1095 705/7.19 |
| 2015/0248739 A1 | 9/2015 | Schulman et al. | |
| 2016/0092576 A1* | 3/2016 | Quercia | G06Q 30/00 707/734 |
| 2016/0292161 A1 | 10/2016 | Liu et al. | |

\* cited by examiner

SELECTING CONTENT FOR PRESENTATION TO AN ONLINE SYSTEM USER BASED ON AFFINITIES OF THE USER FOR ADDITIONAL USERS INFERRED FROM AN ORGANIZATIONAL CHART

BACKGROUND

This disclosure relates generally to online systems, and more specifically to selecting content for presentation to users of an online system.

An online system allows its users to connect to and to communicate with other users of the online system. Users create profiles on an online system that are tied to their identities and include information about the users, such as interests and demographic information. The users may be individuals or entities such as corporations or charities. Users may share information about themselves via an online system by posting content for presentation to other online system users.

To further encourage interaction with the online system by users, the online system may generate content describing actions performed by online system users for presentation to other online system users, such as online system users connected via the online system to an online system user who performed an action. Online system users may interact with content provided by the online system. For example, an online system user may indicate a preference for content provided by the online system, share the content with additional users provided by the online system, or comment on the content provided by the online system. The online system may account for interactions with content by a user when selecting additional content for presentation to the user.

Conventionally, online systems select content for presentation to a user based on measures of relevance between the user and various content. A measure of relevance between the user and content may be based on prior user interactions with content, connections between the user and other users associated with the content, or characteristics of the user. Presenting content with high measures of relevance to the user increases user interaction with the online system, providing opportunities for the online system to generate revenue (e.g., by presenting content to users for which the online system receives compensation for presenting). However, certain users of an online system have limited connections to additional users of the online system, which may limit selection of content by the online system for presentation to the certain users. For example, if a user who recently created a user profile on the online system and has not established connections to many additional users, the online system has limited information associated with the user for selecting content to present to the user, which is likely to limit interaction with the online system by the user.

To increase opportunities for users for whom the online system has limited information, the online system may use common attributes, such as interests and demographic information, between the user and additional users. For example, the online system presents content to a user that is associated with additional users to whom the user does not have a direct connection (e.g., additional users who are connected to users to whom the viewing user is connected). As an additional example, the online system presents content to a user that is associated with additional users who attended the same university as the user. However, using common attributes between a user and additional users to select content may cause the online system to present content to the user that is associated with additional user with whom the user lacks a real-life relationship. Moreover, if a user does not have connections to additional users of the online system or has not provided information to the online system describing the user's characteristics, the online system may still lack information to select content for presentation to the user, limiting interaction between the user and the online system.

SUMMARY

An online system provides a social networking environment for a set of users of the online system. Users in the set of users may be members of an organization or employees of a company. The online system allows users in the set to establish connections with other users of the online system, including users who are not included in the set. For example, a user in the set establishes a connection with another user, allowing the user in the set to receive status updates and other information associated with the other users. Based on a user's connections to other users of the online system, the online system selects and presents content to the user, increasing the likelihood of the presented content being relevant to the user. For example, the online system presents a feed to a user that includes content items provided to the online system by additional users connected to the user or content items describing actions performed by the additional users connected to the user.

If a user in the set does not have a connection with another user in the set, the online system may establish an "inferred connection" between the user and the other user and use the inferred connection to identify content for presentation to the user or to the other user. The online system determines whether to establish an inferred connection between a user in the set and an additional user in the set based on a measure of affinity of the user for the additional user. In some embodiments, the online system determines the measure of affinity of the user for the additional user based on a relationship between the user and the additional user described by an organizational chart associated with the set of users. For example, the online system receives the organizational chart from an organization (e.g., a charity, an employer) associated with the set of users. For example, the set of users includes employees of a company, so the online system determines a relationship between a user and an additional user in the set based on the relationship between the user and the additional user described by the organizational chart. In the preceding example, if the user and the additional user are in the same department of the company, a measure of affinity of the user for the additional user is higher than if the user and the additional user are in different departments.

The measure of affinity of the user for the additional user (or between the user and the additional user) in the set may is also be based at least in part on indicators associated with the user and the additional user. An indicator associated with a user and an additional user is information describing characteristics common to the user and the additional user, actions associated with the user and the additional user, or other information capable of use when determining a measure of affinity of the user for the additional user (or a measure of affinity between the user and the additional user). Example indicators associated with a user and an additional user include: a number of users in the set of users connected to both the user and to the additional user, a number of communications between the user and the additional user, interactions by the user with content provided to the online system by the additional user and vice versa, interactions by the user with a user profile associated with the user and vice versa, and characteristics included in both a user profile associated with the user and in a user profile associated with the additional user (e.g., geographic location, educational background). The online system associate different weights with different indicators associated with the user and the additional user and combine the weights and values of the indicators to determine the measure of affinity of the user for the additional user. In some embodiments, a weight associated with an indicator is proportional to a likelihood that the indicator indicates a relationship between the user and the additional user. For example, the online system associates a higher weight with an indicator based on communications between the user and the additional user than a weight associated with an indicator based on a common geographic location for the user and the additional user as there is a greater likelihood of communications between the user and the additional user indicating an affinity of the user for the additional user than a geographic location common to the user and to the additional user. In one embodiment, the online system uses a machine learned model to determine the measure of affinity of a user for an additional user. The machine learned model may account for a connection between the user and the additional user when determining a measure of affinity of the user for the additional user; for example, higher weights are associated with indicators associated with the user and the additional user if the online system includes a connection between the user and the additional user than if the online system does not include a connection between the user and the additional user.

Based on the measures of affinity of a user in the set for one or more additional users in the set, the online system determines whether to establish an inferred connection between the user and different additional users in the set. For example, if the user has at least a threshold measure of affinity for an additional user, the online system establishes an inferred connection between user and the additional user. As another example, the online system ranks additional users in the set based on the measures of affinity of the user for the additional users and establishes inferred connections between the user and additional users having at least a threshold position in the ranking. For example, inferred connections are established between a user and additional users in the set of users for whom the user has the five highest measures of affinity.

The online system may use the inferred connections between the user and additional users in the set to select content for presentation to the user. For example, when selecting content for inclusion in a feed presented to the user, the online system ranks and selects content items provided to the online system by additional users in the set having an inferred connection to the user. In some embodiments, the online system ranks content items provided to the online system by the additional users having inferred connections to the user based on the measures of affinity of the user for the additional users who provided the content items and selects content having at least a threshold position in the ranking for presentation to the user. Additionally, the online system may use inferred connections between the user and additional users to identify the additional users to the user. For example, when the user requests to send a message to another user of the online system, the online system presents information identifying the additional users having inferred connections to the user in an interface for composing the message or in a contact listing from which the user selects users to receive the message.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
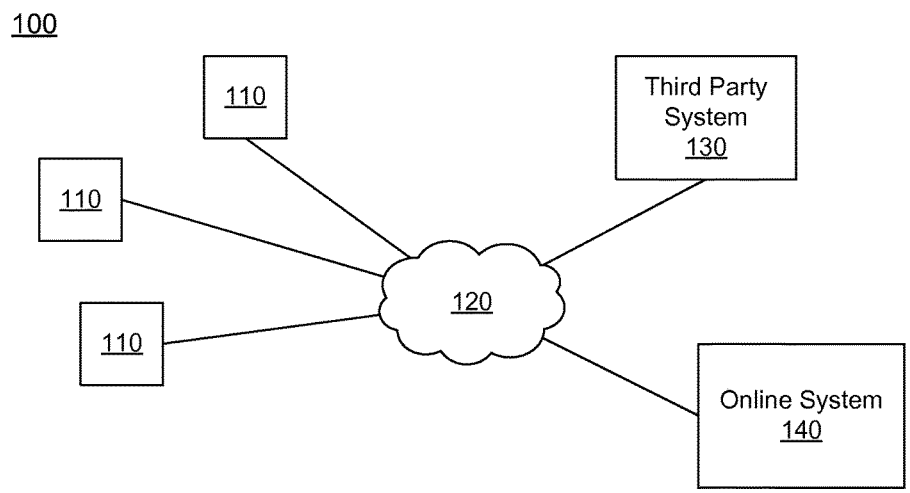
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
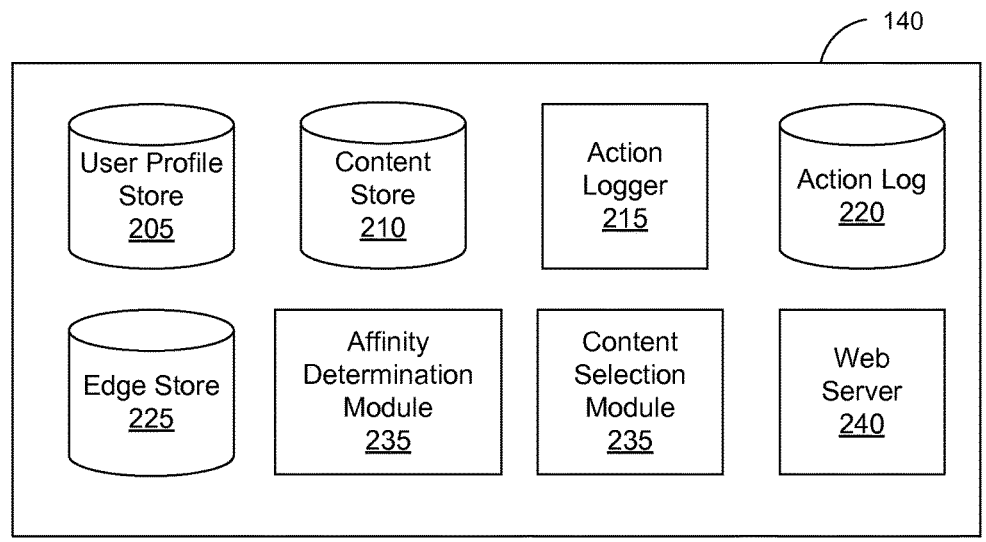
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an affinity determination module 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items (including advertisements), and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140.

Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, interactions with advertisements, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, measures of affinity, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The affinity determination module 230 computes a measure of affinity of a user of the online system 140 for an additional user of the online system 140. In addition to accounting for actions between the user and the additional user when determining the measure of affinity of the user for the additional user, the affinity determination module 230 may retrieve information from the user profile store 205 describing an organizational chart of an organization that includes the user and the additional user. The organizational chart identifies relationships between a set of users included in the organization, such as a hierarchy of users. In various embodiments, the organization provides the organizational chart to the online system 140, which stores the organizational chart in the user profile store 205 in association with the organization. The organizational chart received from the organization may include information used by the online system 140 to identify the set of users included in the organization (e.g., usernames associated with users by the online system 140) or information allowing the online system 140 identify the users (e.g., e-mail addresses). Relationships between the user and the additional user in the organizational chart may influence the measure of affinity of the user for the additional user. For example, if the user and the additional user are in the set of users identified in the organizational chart, a relationship between the user and the additional user specified by the organizational chart increases or decreases the measure of affinity of the user for the additional user. In the preceding example, the measure of affinity of the user for the additional user is higher if the organizational chart indicates the user and the additional user have a common rank or position within a hierarchy specified by the organizational chart than if the organizational chart indicates the user and the additional users have different ranks within the hierarchy specified by the organizational chart. An organizational chart is further described below in conjunction with FIG. 4.

The measure of affinity of the user for the additional user determined by the affinity determination module 230 is also based at least in part on indicators associated with the user and the additional user. An indicator associated with the user and the additional user is information describing characteristics common to the user and the additional user, actions associated with the user and the additional user, or other information capable of use to determine the measure of affinity of the user for the additional user (or a measure of affinity between the user and the additional user). Example indicators associated with a user and an additional user include: a number of users in the set of users connected to both the user and to the additional user, a number of communications between the user and the additional user, interactions by the user with content provided to the online system by the additional user and vice versa, interactions by the user with a user profile associated with the user and vice versa, and characteristics included in both a user profile associated with the user and in a user profile associated with the additional user (e.g., geographic location, educational background).

The affinity determination module 230 may associate different weights with different indicators and apply the weights to values corresponding to the different indicators; the values of the different indicators are combined after application of the weights to the values of the indicators to determine the measure of affinity of the user for the additional user. In some embodiments, a weight associated with an indicator is proportional to a likelihood that the indicator indicates a relationship between the user and the additional user. For example, the online system associates a higher weight with an indicator based on communications between the user and the additional user than a weight associated with an indicator based on a common geographic location for the user and the additional user as there is a greater likelihood of communications between the user and the additional user indicating an affinity of the user for the additional user than a geographic location common to the user and to the additional user. As another example, an indicator based on the user and the additional user having attended the same high school is associated with a higher weight than a weight associated with an indicator based on the user and the additional user expressing a preference for similar video games, as attending the same high school at the same time is more likely to indicate the user has an interest in the additional user than the user and the additional user having similar tastes in video games.

In one embodiment, the affinity determination module 230 uses a machine learned model to determine the measure of affinity of a user for an additional user. The machine learned model may account for a connection between the user and the additional user when determining a measure of affinity of the user for the additional user. For example, higher weights are associated with indicators associated with the user and the additional user if the online system includes a connection between the user and the additional user than if the online system does not include a connection between the user and the additional user. Additionally, in some embodiments, the affinity determination module 230 determines a measure of affinity between the user and the additional user in addition to, or in place of, the measure of affinity of the user for the additional user.

The content selection module 235 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on measures of affinity of the user for additional users associated with the content items. In some embodiments, the measure of relevance of a content item to the user increases as the measure of affinity of the user for an additional user associated with the content item increases. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user. Selection of content for presentation to a user based at least in part on measures of affinity of the user for other users is further described below in conjunction with FIG. 3.

Content items eligible for presentation to the user may include ad requests or other content items associated with bid amounts. The content selection module 235 uses the bid amounts associated with ad requests when selecting content for presentation to the viewing user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content to a user of the online system 140. The feed may include one or more ad requests well as content items, such as stories describing actions associated with other online system users connected to the user. The content selection module 235 accesses one or more of the user profile store 205, the content store 210, the action log 220, and the edge store 225 to retrieve information about the user. For example, information describing actions associated with other users connected to the user or other data associated with users connected to the user are retrieved. Additionally, one or more ad requests may be retrieved from the content store 210. The retrieved content items and ad requests are analyzed by the content selection module 235 to identify candidate content items, including ad requests, eligible for presentation to the user. For example, content items associated with users who are not connected to the user or content items associated with users for whom the user has less than a threshold measure of affinity are discarded as candidate content items. Based on various criteria, the content selection module 235 selects one or more of the content items or ad requests identified as candidate content for presentation to the identified user. The selected content items or ad requests are included in a feed of content that is presented to the user. For example, the feed of content includes at least a threshold number of content items describing actions associated with users connected to the user via the online system 140 or describing actions associated with users to whom the user has at least a threshold measure of affinity.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that is stored in the content store 210. Additionally, the web server 240 may provide application programming interface (API) functionality to send data directly to native client device operating systems, such as IOS®, ANDROID™, WEBOS®, or BlackberryOS.

Figure 3:
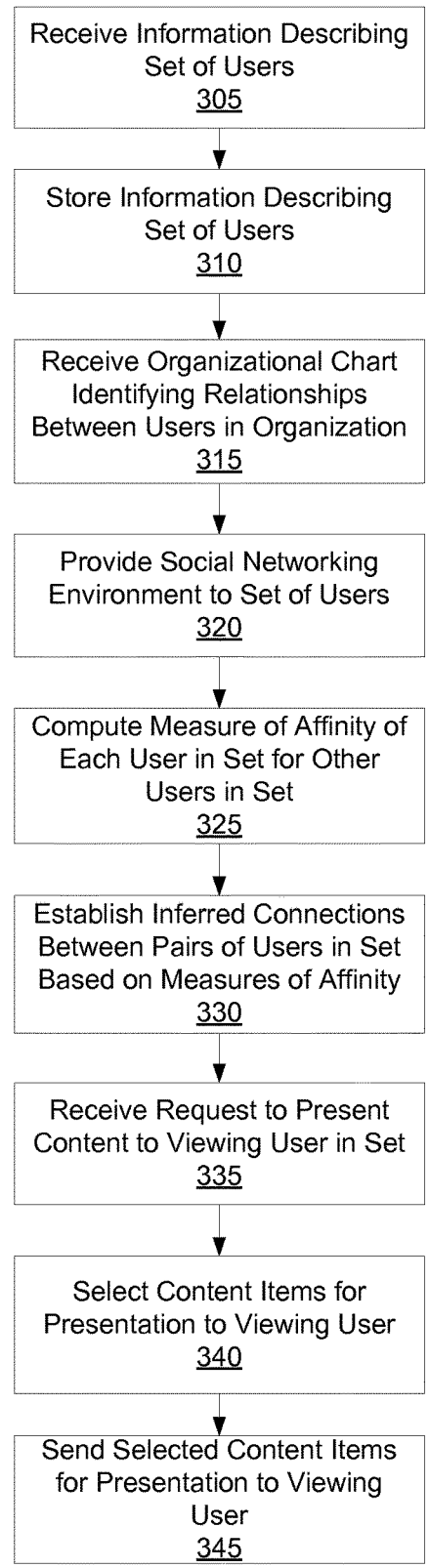
FIG. 3 is a flowchart of a method for selecting content to present to a user of an online system based on measures affinities of the user for additional users of the online system, in accordance with an embodiment.

Using Relationships Between Users from an Organizational Chart for Content Selection FIG. 3 is a flowchart of a method for selecting content to present to a user of an online system 140 based on affinities of the user for additional users of the online system 140. In other embodiments, the method may include different and/or additional steps than those shown in FIG. 3. Additionally, steps of the method may be performed in different orders than the order described in conjunction with FIG. 3 in various embodiments.

The online system 140 receives 305 information identifying a set of users of the online system 140. For example, the online system 140 receives 305 information identifying users who are members of an organization (e.g., a bowling league, a company, a charity, etc.). The set of users may change over time as membership in the organization changes, so users may be removed from the set or included in the set over time. For example, online system users who are employees of a company may change over time as new employees are hired by the company and as existing employees leave the company, so the online system 140 may receive 305 modifications to the set of users over time, allowing the online system 140 to maintain current information identifying the set of users. The information identifying the set of users includes information used by the online system 140 to identify a user in the set (e.g., a username, an e-mail address, or a user identifier associated with the user by the online system 140) or information associated with the user capable of allowing the online system 140 to identify the user (e.g., the user's name, a user identification number, a profile picture). The online system 140 stores 310 the information identifying the set of users and may associate information with users in the set identifying the organization of which the users are members. For example, the online system 140 stores 310 an identifier of a law firm at which a user works in the user profile of the user and stores information identifying users who work at the law firm in association with the identifier of the law firm.

Additionally, the online system 140 receives 315 an organizational chart identifying relationships between users who are members of the organization. The organizational chart may identify one or more hierarchical relationships between users who are members of the organization, roles of users within the organization, or other relationships between users who are members of the organization. In various embodiments, the organizational chart includes information identifying a user and identifying relationships between the user and other users who are members of the organization. For example, an organizational chart for a non-profit animal shelter describes relationships of paid employees (e.g., veterinarians, animal technicians, etc.) to each other and to volunteers, as well as the names and positions of each employee and volunteer. Providing an organizational chart to the online system 140 allows an organization to facilitate communications between its members on the online system 140. For example, a charity provides its organizational chart to the online system 140 to allow its volunteers to more easily establish connections to each other and communicate with each other via the online system 140 when organizing events and fund raisers. In some embodiments, the online system 140 retrieves the organizational chart for an organization from a source associated with the organization (e.g., a website associated with the company) or from another suitable source.

Figure 4:
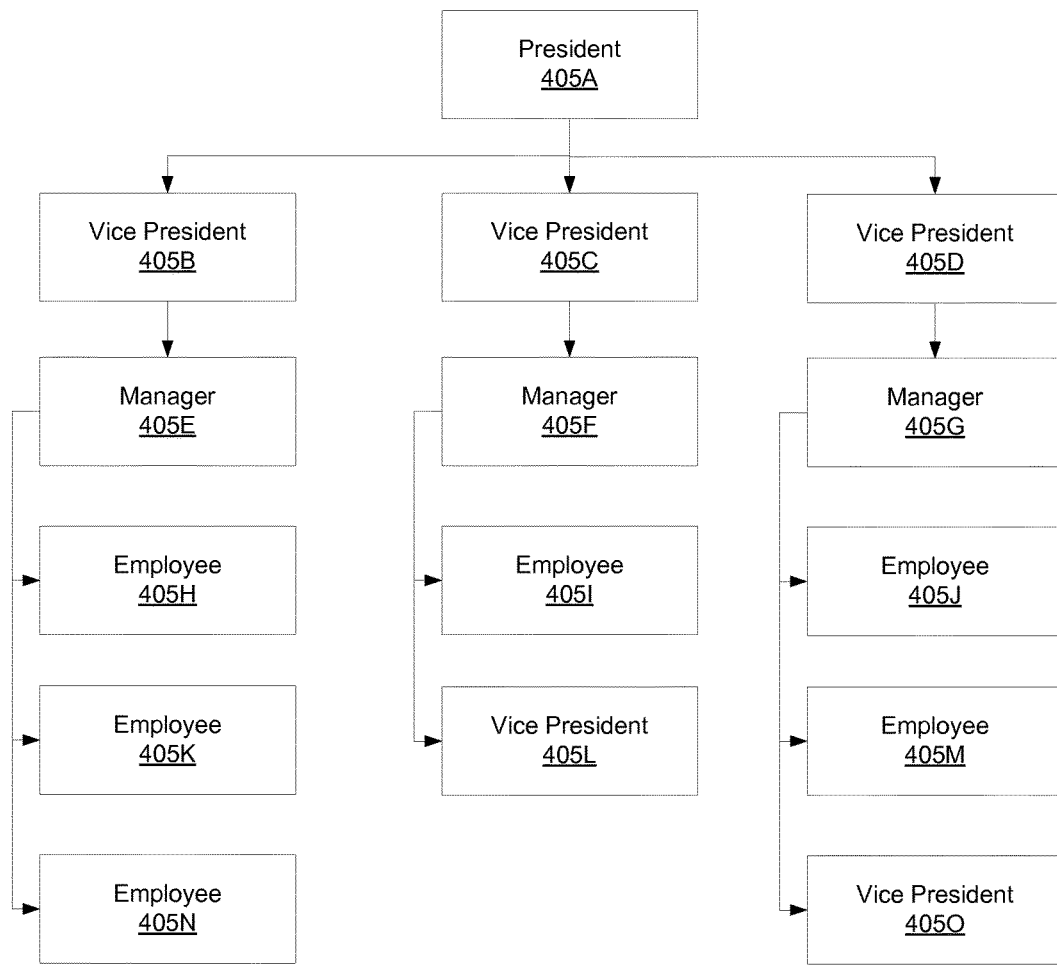
FIG. 4 is an example organizational chart describing relationships between a set of users of an online system, in accordance with an embodiment.

Referring to FIG. 4, an example organizational chart identifying relationships between individuals, including a set of online system users, who are included in an organization. The relationships identified by the organizational chart in FIG. 4 are defined by an individuals' roles in the organization. In various embodiments, the organizational chart organizes individuals as a hierarchy, as a matrix, or as any other suitable representation. The organizational chart may include information identifying individuals included in the organization who are users of the online system 140 (e.g., a username associated with users of the online system 140 by the online system 140). Additionally, the organizational chart associates information identifying a user's role or position with the organization and relationships with one or more other users with information identifying users of the online system 140. In the example, of FIG. 4, the organizational chart identifies a president 405A of the organization, vice presidents 405B-D of the organization, managers 405E-G of the organization, and employees 405H-0 of the organization. The organizational chart also associates information identify an individual associated with a position in the organization. For example, the organizational chart includes a name, a profile picture, and contact information associated with the president 405A. If the president is a user of the online system 140, the organizational chart may include information used by the online system 140 to identify the user (e.g., a username or user identifier associated with the user by the online system 140).

The organizational chart identifies relationships between individuals, including a set of online system users, included in the organization, allowing the organizational chart to describe the structure of the organization. For example, the organizational chart identifies the ranks of different users in the organization relative to each other. In the example of FIG. 4, the organizational chart includes connections between individuals based on relationships between the roles or positions of the individuals within the organization. For example, the organizational chart in FIG. 4 identifies relationships between the president 405A and the vice presidents 405B-D to indicate the vice presidents 405B-D report to the president 405A. Similarly, the organizational chart in FIG. 4 identifies relationships between each vice president 405B-D and managers 405E-G who report to each vice president 405B-D. As another example, the organizational chart in FIG. 4 identifies relationships between different managers 405E-G and employees 405H-O who report to each of the different managers 405E-G. The relationships identified by the organizational chart may be unidirectional (e.g., identifying a superior-subordinate relationship) or bidirectional (e.g., indicating a co-worker relationship). Different organizational charts may describe relationships among individuals belonging to various types of organizations. Example organizations include: business organizations (e.g. companies), government organizations (e.g., military forces and government agencies), private organizations (e.g., private schools and sports leagues), religious organizations, and nonprofit organizations (e.g., charities).

Referring back to FIG. 3, the online system 140 provides 320 a social networking environment to the set of users that allows the users in the set to establish connections to each other and to communicate with each other. For example, the social networking environment provided by the online system 140 to the set of users allows a user in the set to request establishment of a connection to an additional user in the set of users and establishes the connection between the user and the additional user if the additional user accepts the request. After establishing a connection between the user and the additional user, the user and additional user may communicate with each other via the online system 140 using various communication channels provided by the online system 140 (e.g., messages communicated by the online system 140, providing content to a profile page associated with the user or with the additional user, posting comments associated with content provided to the online system 140 by the user or by the additional user). The social networking environment provided 320 to the set of users may also allow the users to perform additional actions with each other or with users outside of the set of users. Example actions that a user may perform via the social networking environment include: creating a user profile associated with the user by the online system 140 and including information describing the user (e.g., profile picture, geographic location, interests, etc.), posting content to a page associated with a user profile (e.g., pictures, status updates, check-ins, etc.), establishing connections with other users that parallel the users' real-life relationships (e.g., friendships, co-workers, family members, etc.), communicating with other users (e.g., via sharing content, exchanging messages, etc.), receiving content selected for the user by the online system 140 (e.g., a feed describing actions performed by additional users to which the user is connected), and establishing connections with objects maintained by the online system 140 (e.g., indicating a preference for a page maintained by the online system 140, joining a group maintained by the online system 140, etc.).

To further encourage interaction with the online system 140, the online system 140 computes 325 measures of affinity for each user in the set of users for other users in the set of users based at least in part on the received information describing the organizational chart. In one embodiment, the online system 325 computes a measure of affinity for each user in the set of users for each other user in the set of users. As the organizational chart received from the organization describes relationships between users in the set of users, the online system 140 accounts for the relationship between a user in the set and an additional user in the set specified by the organizational chart when computing 325 a measure of affinity of the user for the additional user. For example, if the user and the additional user are in the set of users identified in the organizational chart, a relationship between the user and the additional user specified by the organizational chart increases or decreases the measure of affinity of the user for the additional user. In the preceding example, the measure of affinity of the user for the additional user is higher if the organizational chart indicates the user and the additional user have a common rank or position within a hierarchy specified by the organizational chart than if the organizational chart indicates the user and the additional users have different ranks within the hierarchy specified by the organizational chart. As another example, the online system 140 computes 325 a higher measure of affinity of a user for an additional user having a direct relationship with the user via the organizational chart than for the user and another additional user having an indirect relationship with the user via the organizational chart; referring to FIG. 4, a measure of affinity of the president 405A for a vice president 405B-D is higher than a measure of affinity of the president 405A for an employee 405H-O.

Measures of affinity of a user for an additional user are computed 325 based at least in part on indicators associated with the user and the additional user. As described above in conjunction with FIG. 2, an indicator associated with the user and the additional user is information describing characteristics common to the user and the additional user, actions associated with the user and the additional user, or other information capable of use to determine the measure of affinity of the user for the additional user (or a measure of affinity between the user and the additional user). Example indicators associated with a user and an additional user include: a number of users in the set of users connected to both the user and to the additional user, a number of communications between the user and the additional user, interactions by the user with content provided to the online system by the additional user and vice versa, interactions by the user with a user profile associated with the user and vice versa, and characteristics included in both a user profile associated with the user and in a user profile associated with the additional user (e.g., geographic location, gender, interests, hobbies, educational background). Different weights may be associated with different indicators, and the online system 140 applies weights to values corresponding to the different indicators and combines the values of the different indicators are combined after application of the weights to determine the measure of affinity of the user for the additional user. In some embodiments, a weight associated with an indicator is proportional to a likelihood that the indicator indicates a relationship between the user and the additional user. For example, the online system 140 associates a higher weight with an indicator based on communications between the user and the additional user than a weight associated with an indicator based on a common geographic location for the user and the additional user as there is a greater likelihood of communications between the user and the additional user indicating an affinity of the user for the additional user than a geographic location common to the user and to the additional user. As another example, an indicator based on the user and the additional user having attended the same high school is associated with a higher weight than a weight associated with an indicator based on the user and the additional user expressing a preference for similar video games, as attending the same high school at the same time is more likely to indicate the user has an interest in the additional user than the user and the additional user having similar tastes in video games. In some embodiments, an indicator is based on whether the organizational chart indicates a relationship between the user and the additional user; in this embodiment, a higher weight is applied to the indicator the based on whether the organizational chart indicates the relationship between the user and the additional user than to other indicators. As described above in conjunction with FIG. 2, the online system 140 may apply a machine learned model to indicators associated with the user and the additional user to compute 325 the measure of affinity of the user for the additional user.

The online system 140 establishes 330 an inferred connection between a pair of users of the set of users based on the measures of affinity of users in the set of users for other users in the set of users. In various embodiments, the online system 140 establishes 330 an inferred connection between a user in the set of users and an additional user in the set of users if the measure of affinity of the user for the additional user equals or exceeds a threshold value; however, if the measure of affinity of the user for the additional user is less than the threshold value, the online system 140 does not establish the inferred connection between the user and the additional user. In other embodiments, the online system 140 ranks additional users in the set of users based on the measures of affinity of the user for the additional user (e.g., additional users for whom the user has higher measures of affinity have higher positions in the ranking) and establishes 330 inferred connections between the user and additional users in the set of users having at least a threshold position in the ranking. In some embodiments, the online system 140 establishes 330 inferred connections between a user and at least a threshold number or percentage of additional users in the set of users based on the ranking of additional users by measures of relevance. If the online system 140 establishes 330 an inferred connection between a user and an additional user, an option may be presented to the user to establish an explicit connection to the additional user or an option may be presented to the user to remove the implicit connection between the user and the additional user. In one embodiment, the online system 140 does not distinguish between inferred connections and explicit connections between the user and additional users.

A unidirectional or a bidirectional inferred connection may be established 330 between the user and an additional user for whom the user has at least a threshold measure of affinity. In one embodiment, a unidirectional inferred connection is established 330 between the user and the additional user if the measure of affinity of the user for the additional user equals or exceeds the threshold value and the measure of affinity of the additional user for the user is less than the threshold value. A bidirectional inferred connection may be established 330 between the user and the additional user if the measure of affinity of the user for the additional user equals or exceeds the threshold value and the measure of affinity of the additional user for the user equals or exceeds the threshold value. Alternatively, a unidirectional or bidirectional inferred connection between the user and an additional user is established 330 based at least in part on indicators associated with the user and the additional user used to determine the measure of affinity of the user for the additional user. In some embodiments, if a measure of affinity of the user for the additional user equals or exceeds the threshold value and one or more specific indicators (e.g., indicators based on a number of communications between the user and the additional user, interactions by the user with content provided to the online system 140 by the additional user and vice versa) have values that equal or exceed one or more thresholds, the online system 140 establishes 330 a bidirectional inferred connection between the user and the additional user. For example, if the user has a measure of affinity for the additional user exceeding the threshold value and indicators based on messages communicated between the user and the additional user and based on an amount of content shared between the user and the additional user have values exceeding one or more thresholds, the online system 140 establishes 330 a bidirectional inferred connection between the users. Information describing the inferred connections established 330 between the user and the additional user is stored by the online system 140 in association with the user and with the additional user.

The online system 140 receives 335 a request to present content to a viewing user in the set of users and selects 340 content for presentation to the viewing user based at least in part on the measures of relevance of the viewing user for users in the set of users. For example, the online system 140 receives 335 a request to present a feed of content items to the viewing user or to update a feed of content items presented to the viewing user. In one embodiment, the online system 140 identifies content items associated with users in the set of users having an inferred connection to the viewing user and ranks the identified content items based on the measure of affinity of the viewing user for users associated with the identified content items. The online system 140 selects 340 content items having at least a threshold position in the ranking for presentation to the viewing user. Alternatively, the online system 140 selects 340 content items associated with users in the set for whom the viewing user has at least a threshold measure of affinity for presentation to the viewing user. In other embodiments, the online system 140 determines measures of relevance of various content items for the viewing user and selects 340 content items for presentation to the viewing user based on the measures of relevance. In some embodiments, the online system 140 determines measures of relevance of content items associated with users having an inferred or explicit connection to the viewing user. As described above in conjunction with FIG. 2, a measure of relevance of a content item for the viewing user is based on a measure of affinity of the viewing user for a user associated with the content item (e.g., a user who provided the content item to the online system 140), characteristics of the content item, and prior actions by the user (e.g., actions associated with content items having at least a threshold number or percentage of characteristics matching characteristics of the content item). The online system 140 may rank content items based on their measures of relevance to the user and select 340 content items having at least a threshold position in the ranking or may select 340 content items having at least a threshold measure of relevance for the user. Content items selected by the online system 140 are sent 345 to a client device 110 associated with the viewing user for presentation.

As an additional example, the online system 140 receives 335 a request from the viewing user to communicate a message to another user of the online system 140. The online system 140 provides viewing user with an interface to compose or create the message and to identify other users to receive the message. Based on measures of affinity of the user for other users in the set of users, the online system 140 may present information identifying users in the set via the interface, allowing the viewing user to more easily select the identified users to receive the message. For example, the online system 140 includes usernames or contact information of users in the set of users having an implicit connection to the viewing user in the interface. As another example, the online system 140 orders information identifying other users based on measures of affinity, so other users for whom the user has higher measures of affinity are presented in the interface above users for whom the user has lower measures of affinity.

Figure 5A:
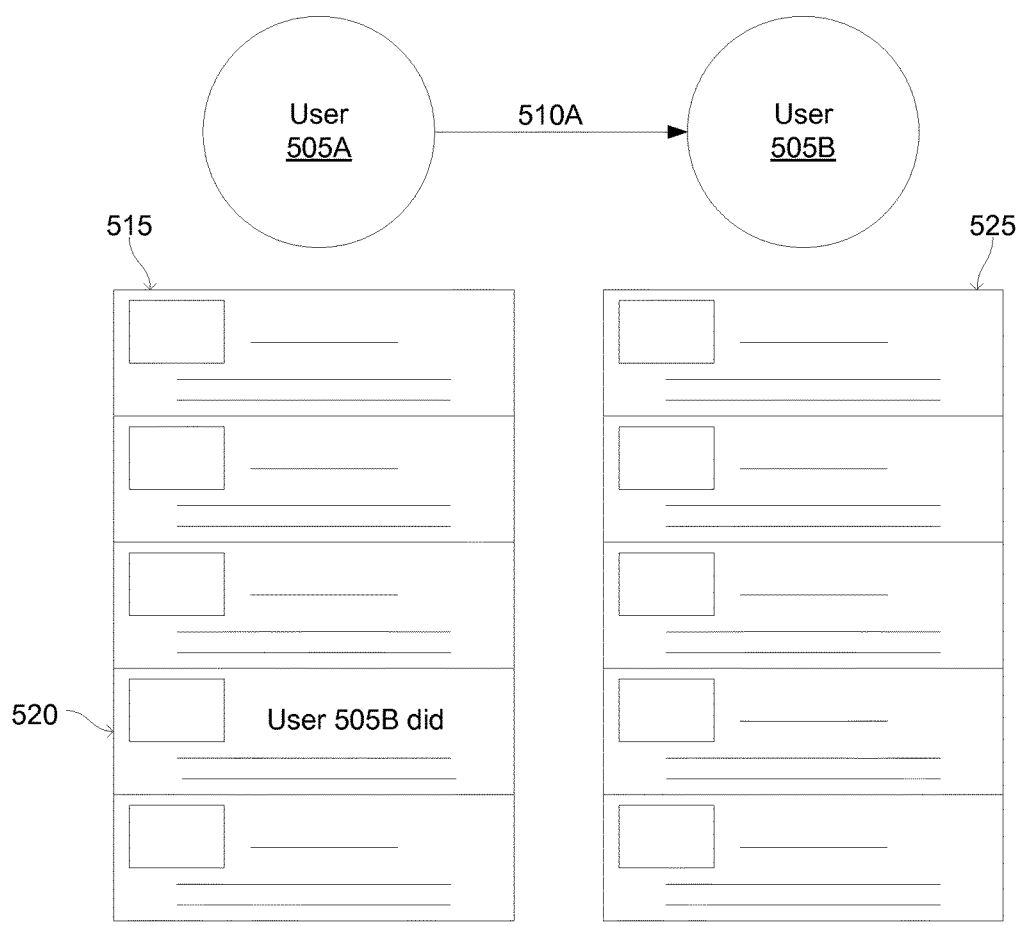
FIGS. 5A and 5B are examples of content presented to users of an online system based on types of connections between the users, in accordance with an embodiment.
Figure 5B:
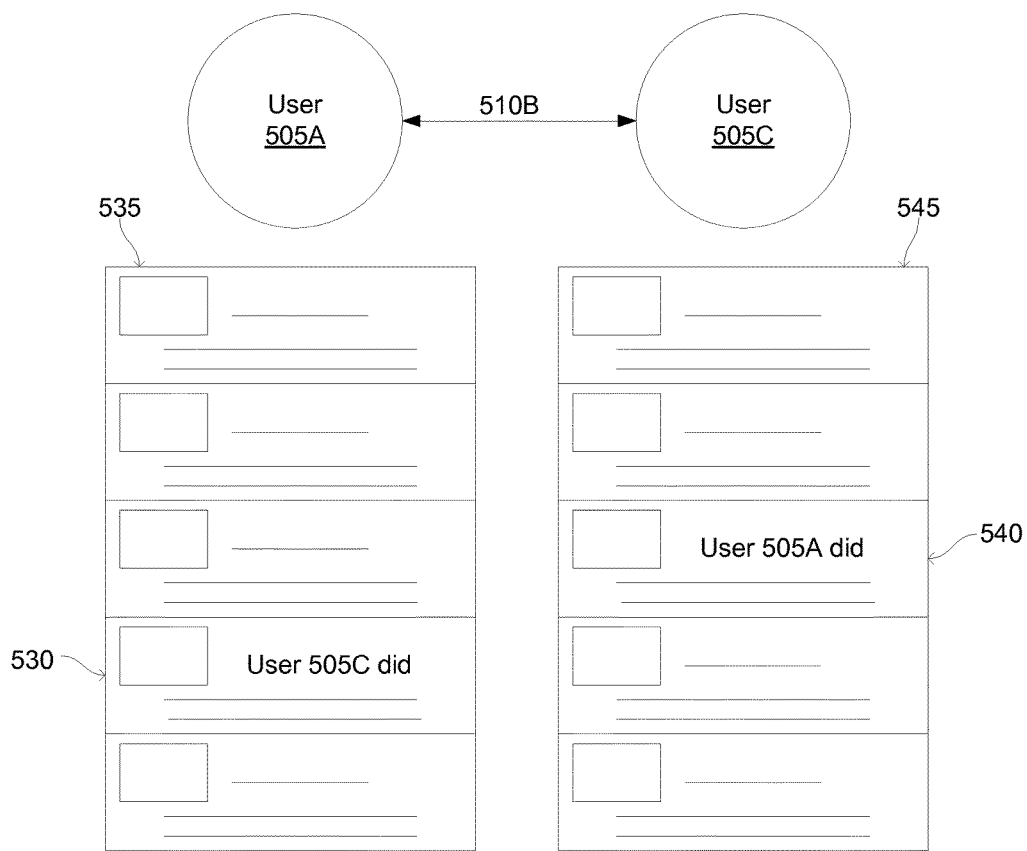

In some embodiments, a type of connection between the viewing user and other users affects content items eligible for presentation to the viewing user. In the example of FIG. 5A, a unidirectional implicit connection 510A is established from a viewing user 505A to an additional user 505B. Accordingly, content 515 presented to the viewing user 505A may include content 520 associated with the additional user 505B; however, content associated with the viewing user 505A is not eligible to be selected for presentation to the additional user 505B. Hence, content 525 presented to the additional user 505B does not include content associated with the viewing user 505A. Alternatively, FIG. 5B shows a bidirectional implicit connection 510B established between the viewing user 505A and another user 505C. Thus, content 535 selected for display to the viewing user 505A may include content 530 associated with the other user 505C and content 545 selected for display to the other user 505C may also include content 540 associated with the user viewing 505A. In one embodiment, content items associated with an additional user eligible for presentation to a user may be based on privacy settings associated with the additional user when an inferred connection is established between the viewing user and the additional user. For example, if a user's privacy settings specify that certain content items associated with the user are only eligible for presentation to additional users identified by the online system 140 as family members of the user, the certain content items are not eligible for presentation to additional users with inferred connections to the user, as the additional users are not identified as family members of the user. Privacy settings specified by a user are maintained in a user profile associated with the user.

If the viewing user has established explicit connections to additional users of the online system 140, but has established less than a threshold number of explicit connections to additional users, when presenting content to the viewing user, the online system 140 initially selects content item associated with additional users having explicit connections to the viewing user. For example, the online system 140 increases a measure of affinity of the viewing user for an additional user having an explicit connection to the user, causing content items associated with the additional user having the explicit connection to the user to be selected for presentation before content items associated with other users having inferred connections to the viewing user. As an example, if a viewing user has fewer than five explicit connections to additional users of the online system 140, content items associated with the users explicitly connected to the viewing user are more likely to be selected (e.g., have higher measures of relevance for the user, have higher positions in a ranking of content items) for presentation than content items associated with other users having an inferred connection to the user. In some embodiments, content items associated with additional users having an explicit connection to the viewing user are ranked based on their measures of relevance and content items associated with additional users having an inferred connection to the viewing user are separately ranked, with content items for presentation to the viewing user selected from both rankings. For example, if less than a threshold amount of content items associated with additional users having explicit connections to the viewing user is selected, content items associated with additional users having inferred connection to the viewing user are selected for presentation. As an example, if the user is composing a message but has explicit connections to three additional users, the online system 140 presents information identifying the three additional users having explicit connections to the user and also displays information identifying three additional users having inferred connections to the user, so that information identifying six additional users is presented.

Figure 5C:
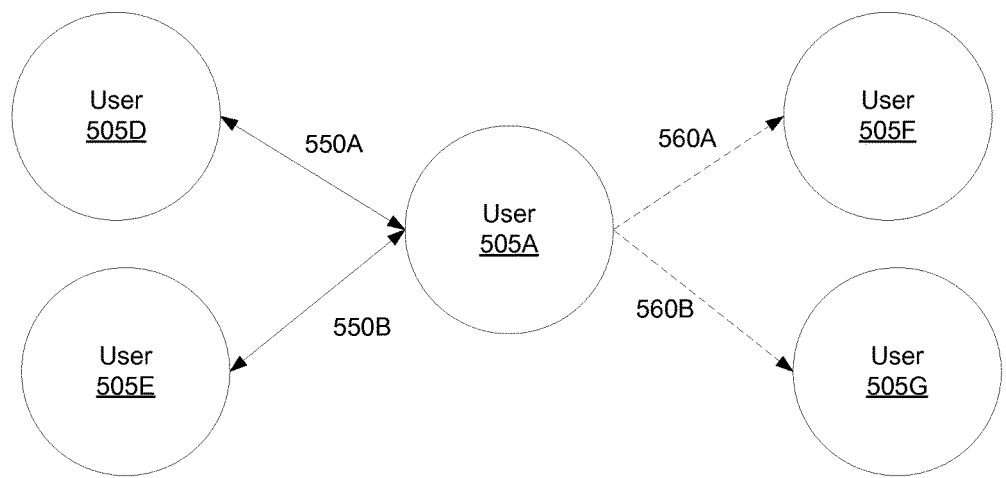
FIG. 5C is an example of content presented to a user of an online system based on different types of connections between the user and additional users of the online system, in accordance with an embodiment.
Figure 5C:
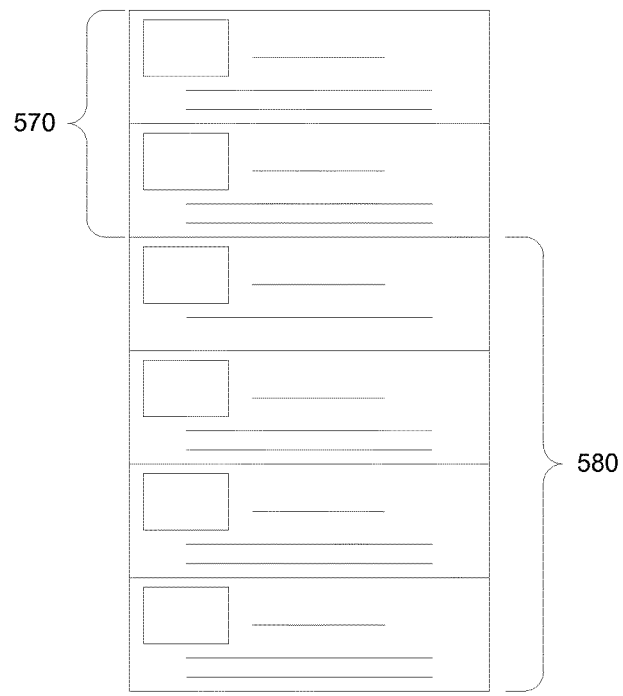

In the example of FIG. 5C, less than a threshold number of content items 570 associated with additional users 505D, 505E having an explicit connection 550A, 550B to the viewing user 505A are eligible for presentation to the viewing user 505A. Accordingly, the online system 140 selects content items 580 associated with additional users 505F, 505G having inferred connections 560A, 560B to the viewing user 505A for presentation to the viewing user 505A. In some embodiments, the online system 140 initially selects content items 570 associated with the additional users 505D, 505E having explicit connections 550A, 550B to the viewing user 505A then subsequently selects content items 580 associated with the additional users 505F, 505G having inferred connections 560A, 560B to the viewing user 505A.

Additionally, the online system 140 may order content presented to the viewing user 505A so content items 570 associated with additional users 505D, 505E having explicit connections 550A, 550B to the viewing user 550A are more prominently presented to the viewing user 505A (e.g., in higher positions in a feed) than content items 580 associated with additional users 505F, 505G having inferred connections 560A, 560B to the viewing user 505A.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving information identifying a plurality of users of an online system, the information including a user profile associated with each user of the plurality of users;
storing the information identifying the plurality of users of the online system;
receiving information describing an organizational chart for an organization, the organizational chart indicating connections among the plurality of users defined by each user's role in the organization;
providing a social networking environment to the plurality of users, the social networking environment enabling the plurality of users to establish connections and to communicate with each other;
computing measures of affinity of each user of the plurality of users for additional users of the plurality of users, the computed measures of affinity based at least in part on the received information describing the organizational chart;
establishing one or more inferred connections between pairs of the plurality of users, wherein a bidirectional inferred connection is established between a user of the plurality of users and an additional user of the plurality of users based on a computed measure of affinity of the user for the additional user equaling or exceeding the threshold value and a computed measure of affinity of the additional user for the user equaling or exceeding the threshold value;
receiving, from a client device of a viewing user of the plurality of users, a request to present content items provided by users of the online system to the viewing user;
ranking one or more content items provided by a set of users of the plurality of users for whom an inferred connection was established with the viewing user;
selecting a content item associated with a user for whom an inferred connection was established with the viewing user based at least in part on the ranking and on privacy settings specified by the user for whom an inferred connection was established with the viewing user; and
sending the selected content item for display to the client device of the viewing user.

2. The method of claim 1, wherein computing a measure of affinity of a user of the plurality of users for an additional user of the plurality of users is further based at least in part on one or more indicators associated with the user of the plurality of users and the additional user of the plurality of users.

3. The method of claim 2, wherein computing the measure of affinity of the user of the plurality of users for the additional user of the plurality of users comprises:
determining values for each of the one or more indicators based on information associated with the user and with the additional user by the online system;
associating weights with each of the one or more indicators, a weight associated with an indicator based at least in part on a likelihood that the indicator indicates a relationship between the user and the additional user; and
computing the affinity score of the user for the additional user based at least in part on the values associated with each of the one or more indicators and the weights associated with each of the one or more indicators.

4. The method of claim 2, wherein an indicator is based on one or more actions associated with the user and with the additional user by the online system.

5. The method of claim 4, wherein an interaction associated with the user and with the additional user comprises a communication between the user and the additional user.

6. The method of claim 4, wherein an interaction associated with the user and with the additional user comprises the user viewing content associated with the additional user.

7. The method of claim 2, wherein an indicator is based on a number of users of the plurality of users connected to the user and connected to the additional user via the online system.

8. The method of claim 2, wherein an indicator is based on characteristics included in a user profile associated with the user and in a user profile associated with the additional user.

9. The method of claim 2, wherein an indicator is based on a number of objects maintained by the online system connected to the user and connected to the additional user via the online system.

10. The method of claim 1, wherein establishing one or more inferred connections between pairs of the plurality of users comprises:
establishing a unidirectional inferred connection between a user of the plurality of user and an additional user of the plurality of users based on a computed measure of affinity of the user for the additional user equaling or exceeding the threshold value and a computed measure of affinity of the additional user for the user being less than the threshold value.

11. The method of claim 1, further comprises receiving a request from the viewing user to communicate a message to another user of the online system.

12. The method of claim 11, wherein responsive to receiving the request, providing the viewing user with an interface to compose the message, the interface identifying the set of users of the plurality of users for whom an inferred connection was established that are ordered based on measures of affinity of the viewing user for each of the set of users.

13. The method of claim 1, wherein the computed measure of affinity of the user for the additional user and the computed measure of affinity of the additional user for the user are computed separately.

14. A computer program product comprising a non-transitory computer-readable storage medium having instructions encoded thereon that, when executed by a processor, cause the processor to:
receive information identifying a plurality of users of an online system, the information including a user profile associated with each user of the plurality of users;
store the information identifying the plurality of users of the online system;
receive information describing an organizational chart for an organization, the organizational chart indicating connections among the plurality of users defined by each user's role in the organization;
provide a social networking environment to the plurality of users, the social networking environment enabling the plurality of users to establish connections and to communicate with each other;

compute measures of affinity of each user of the plurality of users for additional users of the plurality of users, the computed measures of affinity based at least in part on the received information describing the organizational chart;

establish one or more inferred connections between pairs of the plurality of users, wherein a bidirectional inferred connection is established between a user of the plurality of user and an additional user of the plurality of users based on a computed measure of affinity of the user for the additional user equality or exceeding the threshold value and a computed measure of affinity of the additional user for the user equaling or exceeding the threshold value;

receive, from a client device of a viewing user of the plurality of users, a request to present content items provided by users of the online system to the viewing user;

rank one or more content items provided by a set of users of the plurality of users for whom an inferred connection was established with the viewing user;

select a content item associated with a user for whom an inferred connection was established with the viewing user based at least in part on the ranking and on privacy settings specified by the user for whom an inferred connection was established with the viewing user; and send the selected content item for display to the client device of the viewing user.

15. The computer program product of claim 14, wherein a measure of affinity of a user of the plurality of users for an additional user of the plurality of users is further based at least in part on one or more indicators associated with the user of the plurality of users and the additional user of the plurality of users.

16. The computer program product of claim 15, wherein computing the measure of affinity of the user of the plurality of users for the additional user of the plurality of users comprises:

determining values for each of the one or more indicators based on information associated with the user and with the additional user by the online system;

associating weights with each of the one or more indicators, a weight associated with an indicator based at least in part on a likelihood that the indicator indicates a relationship between the user and the additional user; and computing the affinity score of the user for the additional user based at least in part on the values associated with each of the one or more indicators and the weights associated with each of the one or more indicators.

17. The computer program product of claim 15, wherein an interaction associated with the user and with the additional user comprises a communication between the user and the additional user.

18. The computer program product of claim 15, wherein an interaction associated with the user and with the additional user comprises the user viewing content associated with the additional user.

19. The computer program product of claim 14, wherein establishing one or more inferred connections between pairs of the plurality of users comprises:

establishing a unidirectional inferred connection between a user of the plurality of user and an additional user of the plurality of users based on a computed measure of affinity of the user for the additional user equaling or exceeding the threshold value and a computed measure of affinity of the additional user for the user being less than the threshold value.

20. The method of claim 14, wherein the computed measure of affinity of the user for the additional user and the computed measure of affinity of the additional user for the user are computed separately.

* * * * *